(12) United States Patent
Ward et al.

(10) Patent No.: US 11,089,042 B2
(45) Date of Patent: Aug. 10, 2021

(54) VULNERABILITY CONSEQUENCE TRIGGERING SYSTEM FOR APPLICATION FREEZE AND REMOVAL

(71) Applicant: BANK OF AMERICA CORPORATION, Charlotte, NC (US)

(72) Inventors: Julia A. Ward, Charlotte, NC (US); Jessica Kay Aleshire, Fort Mill, SC (US); MacKenzie Smith Durnovich, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 532 days.

(21) Appl. No.: 15/889,797

(22) Filed: Feb. 6, 2018

(65) Prior Publication Data

US 2019/0245879 A1  Aug. 8, 2019

(51) Int. Cl.
  *H04L 29/06* (2006.01)
(52) U.S. Cl.
  CPC ...... *H04L 63/1433* (2013.01); *H04L 63/0236* (2013.01); *H04L 63/10* (2013.01); *H04L 63/1441* (2013.01); *H04L 63/20* (2013.01)
(58) Field of Classification Search
  None
  See application file for complete search history.

(56) References Cited

U.S. PATENT DOCUMENTS

| | | |
|---|---|---|
| 6,711,571 B2 | 3/2004 | Putzolu |
| 7,000,247 B2 | 2/2006 | Banzhof |
| 7,448,066 B2 | 11/2008 | Birk et al. |
| 7,529,981 B2 | 5/2009 | Childress et al. |
| 7,574,740 B1 | 8/2009 | Kennis |
| 7,607,164 B2 | 10/2009 | Vasishth et al. |
| 7,665,119 B2 | 2/2010 | Bezilla et al. |
| 7,668,947 B2 | 2/2010 | Hutchinson et al. |
| 7,698,275 B2 | 4/2010 | O'Brien et al. |
| 7,698,391 B2 | 4/2010 | Paliwal et al. |
| 7,711,683 B1 | 5/2010 | Watanabe et al. |
| 7,761,920 B2 | 7/2010 | Bezilla et al. |
| 7,774,848 B2 | 8/2010 | D'Mello et al. |
| 7,818,788 B2 | 10/2010 | Meier |
| 7,962,696 B2 | 6/2011 | Steely, Jr. et al. |

(Continued)

*Primary Examiner* — Jeffery L Williams
(74) *Attorney, Agent, or Firm* — Michael A. Springs; Moore & Van Allen PLLC; Jeffrey R. Gray

(57) ABSTRACT

The invention relates generally to monitoring and managing network components, such as monitoring the network components to determine the vulnerabilities of the network components, implementing remediation plans for the vulnerabilities, instituting remediation exceptions for the vulnerabilities, and taking consequence actions for the vulnerabilities. When implementing the remediation plan, at least a portion of the network component may be frozen such that a user cannot operate at least a portion of the network component until the vulnerability is remediated. After implementing the remediation plan, monitoring of the network components and the remediation plan continues in order to identify triggers. If a trigger is identified, the consequence action may be implemented, which may prevent operation of the network components by disconnecting or blocking them from the network, uninstalling the network component, deactivating or powering down the network component.

17 Claims, 3 Drawing Sheets

(56) References Cited

U.S. PATENT DOCUMENTS

| | | |
|---|---|---|
| 7,962,960 B2 | 6/2011 | Fudge |
| 7,992,033 B2 | 8/2011 | Childress et al. |
| 8,224,937 B2 | 7/2012 | Childress et al. |
| 8,291,093 B2 | 10/2012 | Choe |
| 8,341,691 B2 | 12/2012 | Bezilla et al. |
| 8,375,113 B2 | 2/2013 | Sinn et al. |
| 8,561,134 B2 | 10/2013 | Bezilla et al. |
| 8,561,175 B2 | 10/2013 | Williams et al. |
| 8,613,080 B2 | 12/2013 | Wysopal et al. |
| 8,769,412 B2 | 7/2014 | Gill et al. |
| 8,776,170 B2 | 7/2014 | Bezilla et al. |
| 8,924,577 B2 | 12/2014 | Choe |
| 8,984,586 B2 | 3/2015 | Bezilla et al. |
| 8,984,643 B1 | 3/2015 | Krisher et al. |
| 9,100,431 B2 | 8/2015 | Oliphant et al. |
| 9,154,523 B2 | 10/2015 | Bezilla et al. |
| 9,253,202 B2 | 2/2016 | Thakur |
| 9,270,695 B2 | 2/2016 | Roytman et al. |
| 9,436,820 B1 | 9/2016 | Gleichauf et al. |
| 9,467,464 B2 | 10/2016 | Gula et al. |
| 9,483,281 B2 | 11/2016 | Bonczkowski et al. |
| 9,706,410 B2 | 7/2017 | Sreenivas et al. |
| 9,727,728 B2 | 8/2017 | Avrahami et al. |
| 2004/0128370 A1 | 7/2004 | Kortright |
| 2005/0044418 A1 | 2/2005 | Miliefsky |
| 2005/0216957 A1* | 9/2005 | Banzhof ............. H04L 63/0218 726/25 |
| 2005/0229256 A2* | 10/2005 | Banzhof ............. G06F 21/577 726/25 |
| 2006/0010497 A1 | 1/2006 | OBrien et al. |
| 2006/0191012 A1 | 8/2006 | Banzhof et al. |
| 2006/0195905 A1 | 8/2006 | Fudge |
| 2010/0130178 A1 | 5/2010 | Bennett et al. |
| 2010/0216429 A1 | 8/2010 | Mahajan |
| 2010/0242114 A1 | 9/2010 | Bunker et al. |
| 2011/0225275 A1 | 9/2011 | Shah et al. |
| 2012/0046985 A1 | 2/2012 | Richter et al. |
| 2013/0007865 A1 | 1/2013 | Krishnamurthy et al. |
| 2013/0091534 A1 | 4/2013 | Gilde et al. |
| 2014/0331326 A1 | 11/2014 | Thakur |
| 2015/0281287 A1* | 10/2015 | Gill ........................ H04L 63/20 726/1 |
| 2015/0288709 A1 | 10/2015 | Singhal et al. |
| 2016/0253364 A1 | 9/2016 | Gomadam et al. |
| 2017/0220808 A1* | 8/2017 | Schmidt ................ G06F 11/00 |
| 2017/0279799 A1 | 9/2017 | Baltzer et al. |
| 2018/0096260 A1* | 4/2018 | Zimmer ................... G06N 5/04 |
| 2018/0144139 A1 | 5/2018 | Cheng et al. |
| 2019/0087832 A1 | 3/2019 | Mercury et al. |
| 2019/0098028 A1 | 3/2019 | Ektare et al. |
| 2019/0166149 A1* | 5/2019 | Gerrick ................ G06F 21/562 |
| 2019/0245878 A1* | 8/2019 | Ward .................. H04L 63/1433 |
| 2019/0245879 A1* | 8/2019 | Ward ..................... H04L 63/20 |
| 2019/0245880 A1* | 8/2019 | Ward .................. H04L 43/0817 |

* cited by examiner

VULNERABILITY CONSEQUENCE TRIGGERING SYSTEM FOR APPLICATION FREEZE AND REMOVAL

FIELD

The present invention relates to identifying vulnerabilities in network components, and more particularly to triggering consequence actions for vulnerabilities identified in network components.

BACKGROUND

Organizations utilize numerous network components (e.g., network devices, network applications, or the like) for the organization's operations. However, due to the large number of network components, opportunities are created for the occurrence of accidental or purposeful vulnerabilities in the network components. The vulnerabilities may be general vulnerabilities that are potential issues for all types of organizations regardless of the organization type, or may be specific vulnerabilities that are based on the organizations' specific uses and/or specific policies for the organizations' own network components. There exists a need to manage the vulnerabilities within an organization.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for improved monitoring and management of network components, including monitoring the network components to determine the vulnerabilities of network components, implementing remediation plans for the vulnerabilities, instituting remediation suppression for acceptable uses, instituting network component exceptions and rolling exceptions for network components, taking consequence actions for the vulnerabilities, and/or the like. The present invention provides an organization improved control over its network components, thus improving the security for an organization, by providing improved network component information collection and network component decisioning in order to remediate the vulnerabilities. The security of the network components is improved by allowing the organization to remotely monitor the network components for vulnerabilities and remotely control the network components (e.g., freeze at least a portion thereof, limit or prevent operation of the network component in a number of different ways, or the like). Additionally, the present invention provides improved efficiency in monitoring and taking actions with respect to the network components because the monitoring and control of the network components may occur remotely.

Embodiments of the invention relate to first determining the primary user 4 or owner of the network components (e.g., is listed as the owner, the user that is responsible for the network component, the user the uses the network component the most, the user that accesses the network component the most, or the like). Thereafter, the network components are monitored to identify vulnerabilities in the network components. Next, a remediation plan may be implemented, which may include alerting the primary user 4 of the vulnerability, automatically and remotely freezing at least a portion of the network component, providing processes for remediating the vulnerability, providing updates for network components to remove the vulnerability, or the like.

It in some embodiments of the invention, remediation suppression may be implemented for the user 4, vulnerability, network component, or the like when the vulnerability is determined to be an acceptable vulnerability. For example, the remediation suppression may be implemented when the user 4 requests an exception and it is granted, when an exception is granted based on organization policy, and/or when an exception is granted based on third party information. When remediation suppression is implemented the reporting of the vulnerability may be prevented). As such, even though a vulnerability has occurred, the vulnerability may be acceptable and thus at least a portion of the remediation process may be suppressed, the reporting of the vulnerability may be suppressed in order to prevent false notifications of the vulnerabilities, and/or any consequence actions associated with the vulnerability may be suppressed. It should be understood that while the reporting of the vulnerabilities may be suppressed, the remediation suppression, the vulnerabilities, the organization's policies, and/or the network components may still be monitored to make sure changes have not occurred that will change the suppression of the vulnerabilities. For example, the network components may be monitored to make sure company policy does not change that would make the suppression no longer valid, that the network components may have changed such that the network components may no longer have vulnerabilities, and/or the vulnerabilities are no longer considered vulnerabilities.

Alternatively, or in addition to remediation suppression, customized criteria may be created and used to identify rolling network component exceptions that automatically prevent identification and/or remediation of vulnerabilities for particular network components. It should be understood that the customized criteria may be set up by a user or automatically identified by the organization systems. If any current network component or new network components meets the customized criteria, the network component may be automatically rolled into network component exceptions processes in order to prevent a vulnerability action, such as identification of a vulnerability for the network component or remediation of the vulnerability for the network component.

Embodiments of the invention relate to systems, computer implemented methods, and computer program products for a triggering consequence actions for network component vulnerabilities. The invention comprises monitoring network components for vulnerabilities. A vulnerability is identified, and wherein the vulnerability is related to at least one network component of the network components. A remediation plan is identified for the vulnerability for the at least one network component. The remediation plan is implemented for the at least network component. The at least one network components are monitored for compliance with the remediation plan. A trigger is identified for implementing a consequence action for the at least one network component. The consequence action is implemented for the at least one network component when the trigger is identified.

In further accord with embodiments of the invention, the consequence action for the at least one network component comprises preventing operation of at least a portion of the at least one network component until the remediation plan is implemented, wherein preventing the operation of at least the portion of the at least one network component comprises remotely accessing and controlling the at least one network component.

In other embodiments of the invention, the consequence action for the at least one network component comprises removal of the at least one network component from a network.

In still other embodiments of the invention, the removal of the at least one network component comprises remotely disconnecting the at least one network component from the network.

In yet other embodiments of the invention, the removal of the at least one network component comprises blocking a connection of the at least one network component to the network.

In further accord with embodiments of the invention, the removal of the at least one network component comprises uninstalling the at least one network component.

In other embodiments of the invention, the removal of the at least one network component comprises deactivating operation of the at least one network component.

In still other embodiments of the invention, the removal of the at least one network component comprises remotely powering down the at least one network component.

In yet other embodiments of the invention, the trigger comprises a primary user of the network component failing to respond to an alert regarding the remediation plan.

In further accord with embodiments of the invention, the trigger comprises a failure to implement the remediation plan.

In other embodiments of the invention, the trigger comprises a failure to complete the remediation plan by a remediation deadline.

In still other embodiments of the invention, the remediation plan comprises alerting at least a primary user of a remediation process, providing network component updates to remediate the vulnerability, and preventing operation of at least a portion of the at least one network component until the remediation plan is implemented.

In yet other embodiments of the invention further comprises classifying the vulnerabilities for the network components based on priority of the vulnerabilities, the network components exposed to the vulnerabilities, and primary users associated with the vulnerabilities. The invention further comprises generating remediation plans for the vulnerabilities, generating consequence actions for the vulnerabilities, and generating triggers for implementing the consequence actions.

In further accord with embodiments of the invention, the vulnerabilities are classified based on priority of remediation for the vulnerabilities.

In other embodiments of the invention, the priority of remediation for the vulnerabilities are determined based on a scope of the vulnerability, the network components affected by the vulnerability, connection of the network components to other network components, or the primary users of the network components.

In still other embodiments of the invention, the network component comprises a network device or a network application.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
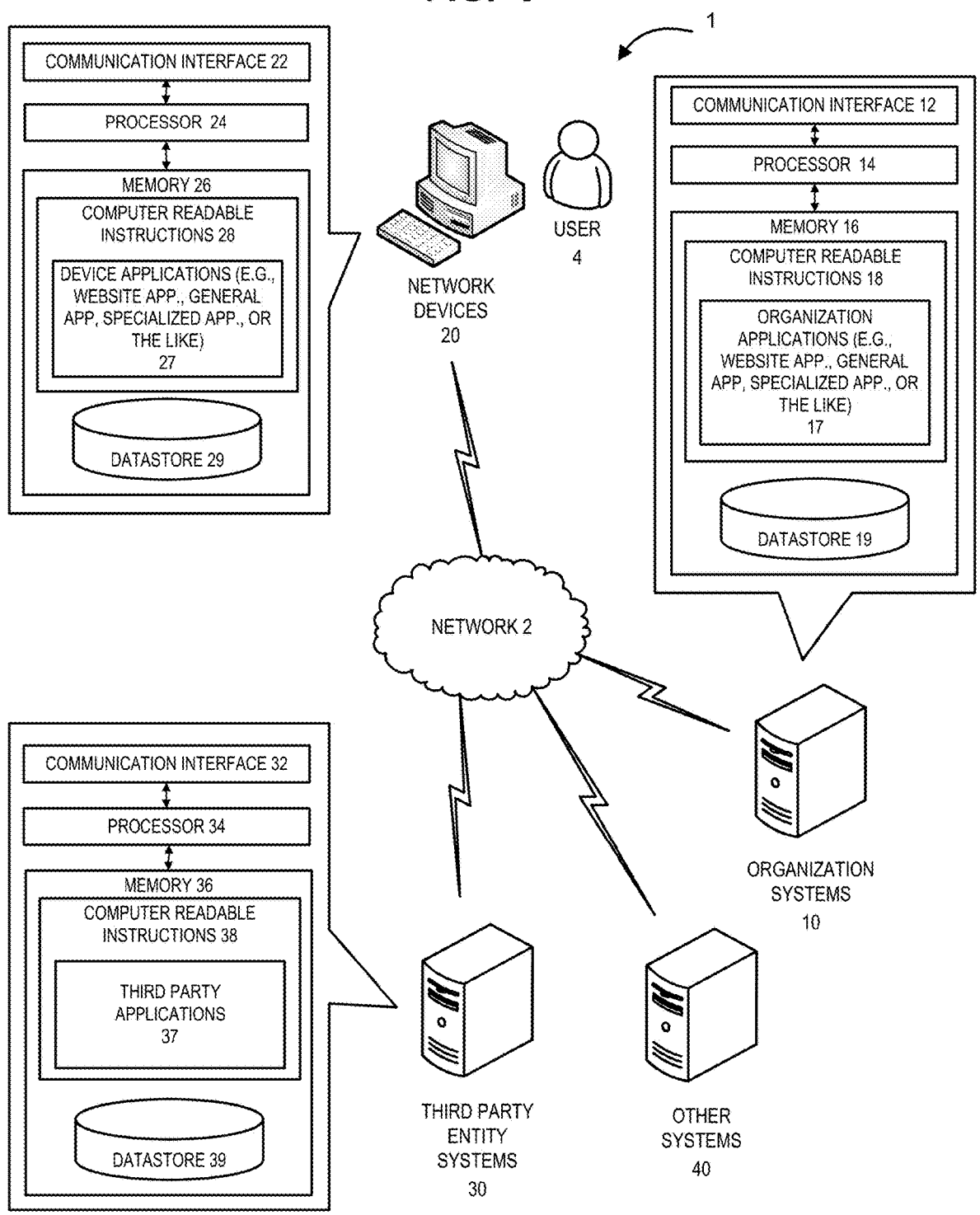

Having thus described embodiments of the invention in general terms, reference will now be made to the accompanying drawings, and wherein:

FIG. 1 illustrates a block diagram of a network device vulnerability system environment, in accordance with one or more embodiments of the invention.

Figure 2:
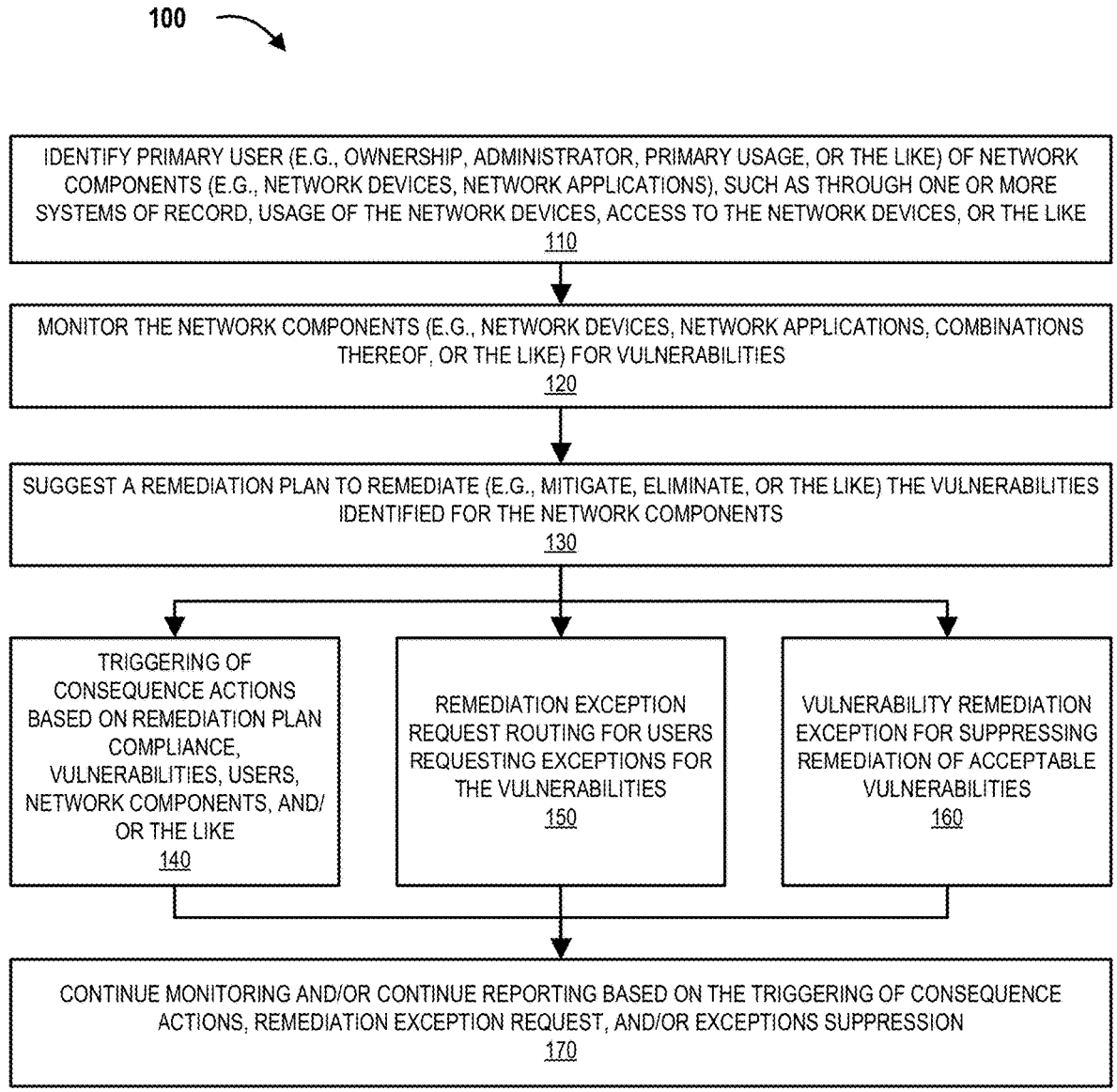

FIG. 2 illustrates a high level process flow for determining and decisioning network device vulnerabilities, in accordance with one or more embodiments of the invention.

Figure 3:
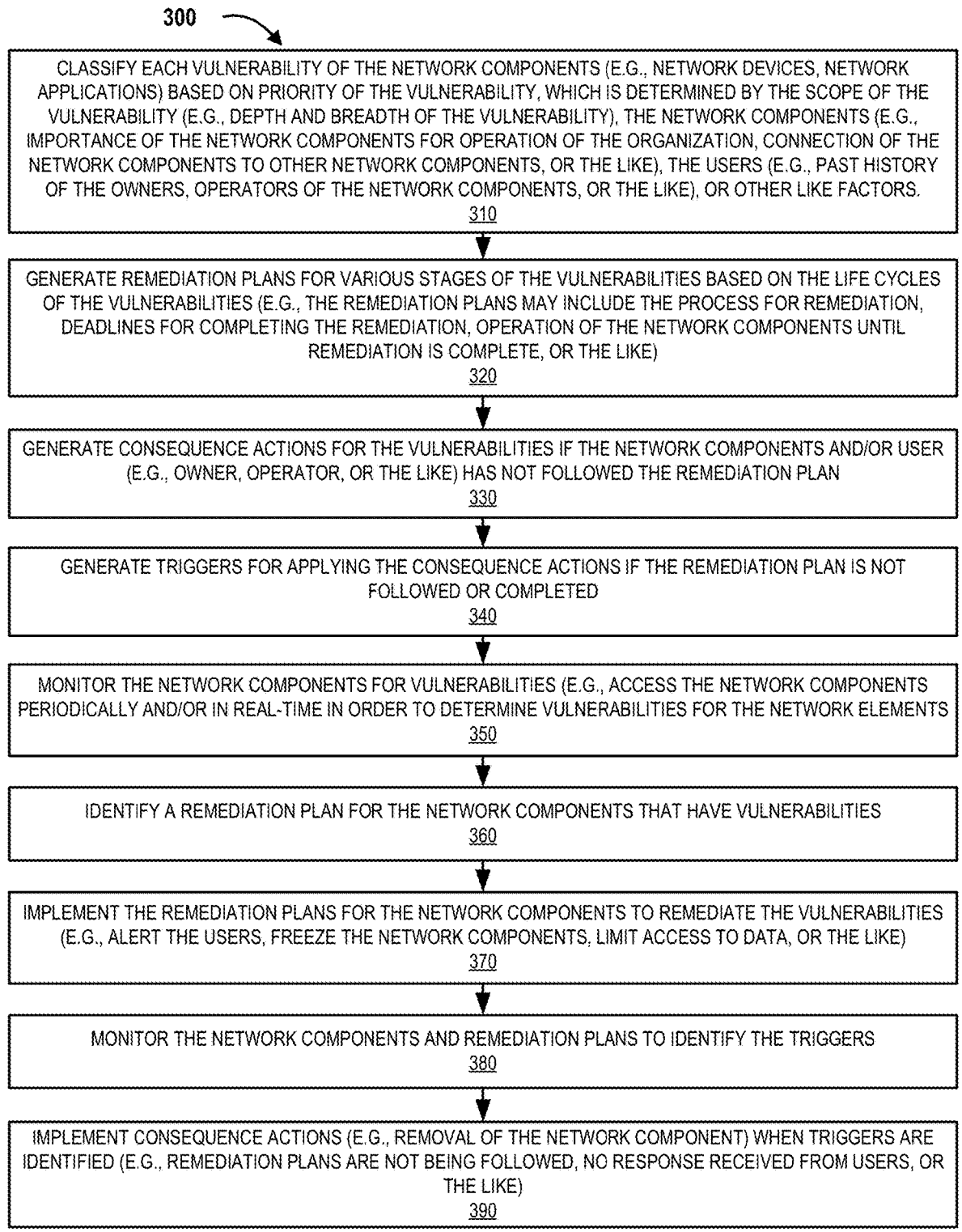

FIG. 3 illustrates a process flow for generating remediation plans for vulnerabilities, creating vulnerability monitoring processes, and implementing remediation plans to remediate the vulnerabilities, in accordance with embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed that monitor and manage network components, including determining the vulnerabilities of network devices and network applications, implementing remediation plans for the vulnerabilities, identifying exceptions for the vulnerabilities, suppressing reporting of the vulnerabilities, and taking consequence actions based on the vulnerabilities (e.g., suspending, blocking, removal, or the like of the network components).

FIG. 1 illustrates a network device vulnerability system environment 1, in accordance with embodiments of the invention. As illustrated in FIG. 1, one or more organization systems 10 are operatively coupled, via a network 2, to one or more network devices 20, one or more third-party systems 30, and/or one or more other systems 40. In this way, a user 4 (e.g., one or more associates, employees, agents, contractors, sub-contractors, third-party representatives, customers, or the like), may be associated with network components (e.g., network devices and/or network applications). It should be understood that the users 4 may be described as a primary user or owner of the network component (e.g., a user that "owns" the network component, a user that is responsible for a specific network component, a user that uses the network component the most, a user that uses the network component during a particular time period, or the like). As such the one or more organization systems 10 may be utilized to monitor the one or more network devices 20 (e.g., the network device hardware, network applications associated therewith, or the like), the one or more third party systems 30, and/or the other systems 40, and thereafter determine or take actions (e.g., remediation plan implementation, consequence actions, exception routing, exception suppression, or the like) for the one or more network devices 20, the one or more third party systems 30, and/or the other systems 40 (or applications thereof), as will be discussed in further detail herein. As such, embodiments of the present invention allow for increased security of the organization's network components using more efficient processes.

The network 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication interfaces 12, one or more processors 14, and one or more memories 16. The one or more processors 14 are operatively coupled to the one or more communication interfaces 12 and the one or more memories 16. As used herein, the term "processor" generally includes circuitry used for implementing the communication and/or logic functions of a particular system. For example, a processor 14 may include a digital signal processor, a microprocessor, and various analog-to-digital converters, digital-to-analog converters, and other support circuits and/or combinations of the foregoing. Control and signal processing functions of the system are allocated between these processors according to their respective capabilities. The one or more processors 14 may include functionality to operate one or more software programs based on computer-readable instructions 18 thereof, which may be stored in the one or more memories 16.

The one or more processors 14 use the one or more communication interfaces 12 to communicate with the network 2 and other components on the network 2, such as, but not limited to, the one or more network devices 20, the one or more third-party systems 30, or one or more other systems 40. As such, the one or more communication interfaces 12 generally comprise a wireless transceiver, modem, server, electrical connection, electrical circuit, or other component for communicating with other components on the network 2. The one or more communication interfaces 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memories 16, which in one embodiment includes the computer-readable instructions 18 of organization applications 17 (e.g., web-based applications, dedicated applications, specialized applications, or the like that are used to monitor, communicate with, and/or take actions with respect to the various network device hardware or software). In some embodiments, the one or more memories 16 include one or more data stores 19 for storing data related to the one or more organization systems 10, including, but not limited to, data created, accessed, and/or used by the one or more organization applications 17. The one or more organization applications 17 may be applications that are specifically used to monitor the network devices 20 and network applications 27, communicate with the network devices 20 and network applications 27, and take actions with respect to the network devices 20 and network applications 27 (e.g., remediate the vulnerabilities, allow for exceptions when requested, suppress the exceptions for reporting, and/or take consequence actions with respect to the network components, as will be described herein).

As illustrated in FIG. 1, users 4 may be associated with one or more of the network components (e.g., network devices 20, network applications 27, or the like). In some cases the users 4 may be primary users, such as uses associated (e.g., owner) with one or more network components, may be the users responsible for the one or more network components, or the like. Alternatively, in some cases the one or more network components may include user computer systems that allow the users 4 to communicate with and/or through the one or more organization systems 10. That is, in some cases, the users 4 may utilize the user computer systems to monitor the one or more network components (e.g., network devices 20, network applications 27, or the like) and/or take actions with respect to the one or more network components (e.g., network devices 20, network applications 27). Additionally, the user computer systems may also be considered one of the network components. As such, it should be understood that the one or more network components may be any type of device, such as a desktop, mobile device (e.g., laptop, smartphone device, PDA, tablet, watch, wearable device, or other mobile device), server, or any other type of system hardware that generally comprises one or more communication interfaces 22, one or more processors 24, and one or more memories 26, and/or the network components may include network applications 27 used by any of the foregoing, such as web browsers applications, dedicated applications, specialized applications, or portions thereof.

The one or more processors 24 are operatively coupled to the one or more communication interfaces 22, and the one or more memories 26. The one or more processors 24 use the one or more communication interfaces 22 to communicate with the network 2 and other components on the network 2, such as, but not limited to, the one or more organization systems 10, the one or more third-party systems 30, and/or the one or more other systems 40. As such, the one or more communication interfaces 22 generally comprise a wireless transceiver, modem, server, electrical connection, or other component for communicating with other components on the network 2. The one or more communication interfaces 22 may further include an interface that accepts one or more network interface cards, ports for connection of network components, Universal Serial Bus (USB) connectors and the like. Moreover, the one or more communication interfaces 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more network devices 20 may have computer-readable instructions 28 stored in the one or more memories 26, which in one embodiment includes the computer-readable instructions 28 for network device applications 27, such as dedicated applications (e.g., apps, applet, or the like), portions of dedicated applications, a web browser or other applications that allow the one or more network devices 20 to operate, that allow users 4 to take various actions using the network devices 20, or the like. For example, the users 4 may take actions with respect to one or more network devices 20, and/or may allow the users 4 to access applications located on other systems, or the like. In some embodiments, the users 4 utilize the one or more network devices 20 in the users' daily operations and/or the users 4 may utilize the one or more network devices 20 (e.g., user computer systems 20) to interact with the organization systems 10, other one or more network devices 20 (or applications 27 thereof), the one or more third-party systems 30, and/or the one or more other systems 40.

As illustrated in FIG. 1, the one or more third-party systems 30 may communicate with the one or more organization systems 10 and/or the one or more network devices 20 directly or indirectly (e.g., through the organization). The one or more third party systems 30, and/or third-party applications 37 thereof, may provide services for the one or more network devices 20 and/or the one or more organization systems 10. As such, the one or more third-party systems 30 are operatively coupled, via a network 2, to the one or more organization systems 10, the one or more network devices 20, and/or the other systems 40. The one or more third-party systems 30 generally comprise one or more communication interfaces 32, one or more processors 34, and one or more memories 36.

The one or more processors 34 are operatively coupled to the one or more communication interfaces 32, and the one or more memories 36. The one or more processors 34 use the one or more communication interfaces 32 to communicate with the network 2 and other components on the network 2, such as, but not limited to, the one or more organization systems 10, the one or more network devices 20, and/or the one or more other systems 40. As such, the one or more communication interfaces 32 generally comprise a wireless transceiver, modem, server, electrical connection, or other component for communicating with other components on the network 2. The one or more communication interfaces 32 may further include an interface that accepts one or more network interface cards, ports for connection of network components, Universal Serial Bus (USB) connectors and the like.

As illustrated in FIG. 1, the one or more third-party systems 30 may have computer-readable instructions 38 stored in the one or more memories 36, which in some embodiments includes the computer-readable instructions 38 of one or more third party applications 37 that provide services to the one or more network devices 20 and/or the one or more organization systems 10. The access to the one or more third-party systems 30, or applications thereof, may be controlled by the one or more organization systems 10 and/or the one or more network devices 20, as will be described herein.

Moreover, as illustrated in FIG. 1, the one or more other systems 40 may be operatively coupled to the one or more organization systems 10, the one or more network devices 20, and/or the one or more third-party systems 30, through the network 2. The other like systems have features that are the same as or similar to the features described with respect to the one or more organization systems 10, the one or more network devices 20, and/or the one or more third-party systems 30 (e.g., one or more communication interfaces, one or more processors, and one or more memories with computer-readable instructions of one or more applications, one or more datastores, or the like). Thus, the one or more other systems 40 communicate with the one or more organization systems 10, the one or more network devices 20, the one or more third-party systems 30, and/or each other in same or similar way as previously described with respect to the organization systems 10, the network devices 20, and/or the third-party systems 30.

FIG. 2 illustrates a high level process flow for monitoring network components (e.g., network devices 20, network applications 27, combinations thereof, or the like), and suggesting remediation plans, identifying triggering for consequence actions for the network components, allowing for remediation exceptions and remediation exception suppression, and/or the like in response to identifying vulnerabilities with the network components. As illustrated in block 110 of FIG. 2, the primary user (e.g., owner assigned to the network component, administer, person with primary operation of the network components, and/or the like) of the network components may first be determined (e.g., identified from one or more systems of record, assigned based on the network component usage, assigned based on network component access, and/or the like). As will be described in further detail herein, the primary user may be determined by accessing one or more systems of record that store primary user details for the network components (e.g., network devices 20, network applications, or the like). It should be understood that if two or more systems of record conflict with each other, or do not include network component information regarding a primary user, the present invention may assign ownership to a user 4 based on the users 4 that access the network components, use of the network components, network traffic for the network components, or otherwise users 4 that can be tied to the network elements through electronic data. It should be understood that the identification of the primary user is described in further detail with respect to U.S. patent application Ser. No. 15/889,944 entitled "Network Device Owner Identification and Communication Triggering System" filed concurrently herewith, which is incorporated by reference in its entirety herein.

Block 120 of FIG. 2 illustrates that the network components are monitored for vulnerabilities. It should be understood that vulnerabilities of network components may be any type of vulnerabilities, such as but not limited to, data security breaches, unauthorized access, data that has been copied, elements that do not utilize passwords, elements that do not utilize additional authentication factors, devices that include eavesdropping, malware, spyware, ransomware, Trojan horses, viruses, worms, rootkits, bootkits, keylogger, screen scrapers, vulnerability attacks, backdoors, logic bombs, payloads, denial of services software, elements do not have up-to-date software, allows downloading of data onto external drives, does not utilize screen locks, timed locks, or other electronic locking, systems that do not scan incoming or outgoing data, does not comply with physical security (e.g., is not properly stored, has been removed without authorization), does not have location determination activated, have applications downloaded without authorization, interacts with restricted hardware or software, accessed unsecure websites (e.g., that do not use encryption, or do not use https URLs). It should be understood that the vulnerabilities may be universal vulnerabilities that are general to all organizations, and/or may be specific to the organization (e.g., specific policy vulnerabilities for the organization as a whole or for a specific subset of the organization, such as a line of business, group, or the like). As such, the vulnerabilities may be general outside vulnerabilities to the network components, or specific policies of the organization that a network component and/or user 4 thereof may be violating. It should be understood that the vulnerabilities being monitored may be set by the organization and/or may be set by the third-party providing the network components (e.g., providing the network devices 20 and/or applications thereof). As will be discussed in further detail herein, the network components may be monitored automatically by the organization systems 10 and/or user computer systems in order to determine any vulnerabilities. The monitoring of the network components is discussed in further detail with respect to FIG. 3.

Block 130 of FIG. 2 illustrates that each of the vulnerabilities may have an associated remediation plan (e.g., a predetermined remediation plan, a plan developed based on the vulnerability, or the like). The proposed remediation plan may be suggested automatically based on the network elements, the user 4 associated with the network elements, the vulnerabilities, and/or the like, as will be discussed in further detail herein. The remediation plan suggested may include a notification to the primary user (e.g., owner, or the like) of the network component to remediate the vulnerability identified (e.g., mitigate, remove, update, or the like the vulnerability). The remediation plan may also include process steps (e.g., a procedure for remediating the vulnerability), updates (e.g., software updates), links thereto, or the like that can be utilized by the user 4 (e.g., primary user, or another user) to remediate the vulnerability. The notification may include a deadline for implementing the remediation plan and/or a deadline for completing remediation of the vulnerability. The suggestion of the remediation plan will be discussed in further detail with respect to FIG. 3.

Block 140 of FIG. 2 further illustrates that a trigger may occur if the remediation plan of the network component is not followed. As such, there may be a triggering of one or more consequence actions for the network component and/or primary user associated therewith. In some embodiments, the network components (e.g., network device, network application, combination thereof) may be suspended (e.g., at least a portion thereof may be prevented from operation, frozen, or the like) after a vulnerability is first identified. In some embodiments suspension of the network component, or portion thereof, may occur before and/or when the remediation is suggested, or in other embodiments, if the user 4 does not implement the suggested remediation plan before a particular remediation deadline. That is, a user 4 (e.g., an owner, or other user 4 using the network components) may be prevented from using the network components (e.g., the network device, network application, application accessed through the network device, portions thereof, or the like) until the vulnerability is remediated. As will be discussed in further detail later, in some embodiments of the invention, if the remediation is not implemented, for example, before a particular remediation deadline, a consequence action may be implemented. The consequence action my include removing the network component (e.g., disconnecting from the network, blocking access to the network 2, uninstalling, deactivating, powering down, or the like) as will be discussed in further detail herein.

Block 150 illustrates that in some embodiments, a user 4 may request a remediation exception for the identified vulnerability. That is, the user 4 may request an exception to allow for the continued use of the network component with the presence of the identified vulnerability (e.g., unfreeze the network component, prevent implementation of the remediation plan, and/or prevent the consequence action for the network component). For example, if the network component violates the organization policy, but is needed for a specific reason or falls within an exclusion, the user 4 may request continued use of the network component with the vulnerability without implementing the remediation plan. It should be understood that the remediation exception request routing is described in further detail with respect to U.S. patent application Ser. No. 15/889,949 entitled "Exception Remediation Logic Routing and Suppression Platform" filed concurrently herewith, which is incorporated by reference in its entirety herein.

Block 160 of FIG. 2 illustrates that in some embodiments, in response to the remediation exception, reporting of the associated vulnerability for the network component may be suppressed in order to prevent the implementation of the remediation plan and/or consequence actions for the vulnerability. Suppression of the reporting, the remediation plan, and/or the consequence actions may occur when the user 4 requests an exception and it is granted, when a remediation suppression is automatically granted based on organization policy, or the like. As such, reporting of the vulnerability may be prevented in order to prevent false notifications of the vulnerabilities (e.g., prevent unneeded reporting of the vulnerability if the vulnerability has been allowed). It should be understood that while the reporting of the vulnerabilities may be suppressed, the remediation suppressions, vulnerabilities, users 4, and/or network components may still be monitored to make sure changes have not occurred that will change the suppression of the vulnerabilities, the remediation plan, and/or the consequence actions. For example, the organization policies may be monitored in order to make sure policy changes do not occur that would result in the removal of the remediation suppression (e.g., the remediation suppression is no longer valid and is rescinded). It should be understood that the remediation suppression for acceptable vulnerabilities is described in further detail herein with respect to FIG. 3.

Additionally, or alternatively with respect to block 160, the present disclosure indicates that instead of or in addition to remediation suppression, customized criteria may be created and used to identify rolling network component exceptions that automatically prevent remediation of vulnerabilities for particular network components before the vulnerabilities are identified and remediation begins. It should be understood that the rolling network component exceptions are described in further detail with respect to U.S. patent application Ser. No. 15/889,799 entitled "Exception Remediation Logic Rolling Platform" filed concurrently herewith, which is incorporated by reference in its entirety herein.

FIG. 2 further illustrates in block 170 that monitoring and/or reporting of the triggering, remediation exception requests, and/or rolling exceptions or suppression for the vulnerabilities of the network components are continued until the network components are removed and/or the rolling exceptions or suppressions are rescinded (e.g., no longer exceptions or suppression is no longer required due to remediation of the vulnerability, change in organization policies, or the like).

FIG. 3 illustrates a process flow 300 for generating remediation plans for vulnerabilities, creating vulnerability monitoring processes, implementing remediation plans to remediate the vulnerabilities, and/or implementing consequence actions in response to triggers in accordance with embodiments of the invention.

Block 310 of FIG. 3 illustrates that each of the potential vulnerabilities for each of the network components (e.g., network devices, network applications, or the like) are determined and/or classified based on priority of the vulnerability. It should be understood that the vulnerabilities may be general vulnerabilities that could potentially affect the network components, such as but not limited to, viruses, software bugs, worms, or the like (as previously described herein), which may affect any type of network components across various organizations. Alternatively or additionally, the vulnerabilities may be specific vulnerabilities that could occur based on organization policies, such as but not limited to policies related to multifactor authentication processes, access to data, use of the network components, or the like (as previously described herein). It should be understood that the vulnerabilities may change over time based on new potential vulnerabilities identified or other vulnerabilities that are eliminated, such as through updating, adding, and/or removing network components.

The potential vulnerabilities for the network components are also classified based on priority of the vulnerabilities. The priority of the vulnerability may be determined based at least in part on the scope of the vulnerability. The scope of the vulnerability may be the depth and breadth of the vulnerability, such as the threat imposed by the vulnerability (e.g., minor process that is not followed versus a backdoor to customer data), as well as the number of network components affected by the vulnerability (e.g., affects a local branch versus national Internet operations). The priority of the vulnerability may also be determined based on network components associated with the vulnerability, such as the importance of the network components to the operations of the business. For example, devices and applications that are customer facing, or that store customer information have a higher priority than back office network components that are not necessary for immediate operation of the organization. Furthermore, the access of the network components to other network components may also determine priority classification for the priority of the vulnerabilities. For example, if the network components interface with critical network components for the organization as opposed to non-critical components, the network components that interface with critical network components may receive a higher priority for remediation. Additional factors in determining the classification of the vulnerabilities may include the users 4 of the network components (e.g., the primary user), such as if the users 4 have a past history with network component vulnerabilities (e.g., not remediating the vulnerabilities on time, causing the vulnerabilities, or the like).

FIG. 3 further illustrates in block 320 that remediation plans are generated for the vulnerabilities for each of the network components. The remediation plans may be generated for different stages of the life cycles of the vulnerabilities for each of the network components. It should be understood that the remediation plans may include a process for remediation of a particular vulnerability and/or a particular network component. The remediation plan may further include deadlines for completing the remediation of the vulnerability, for example, deadlines that the users 4 (e.g., primary user, or the like) must meet in order to timely remediate the vulnerability. The remediation plan may also include suppression of at least a portion of the operation of the network component to prevent the vulnerability from resulting in security breach. For example, the remediation plan may include the ability to prevent the use of at least a portion of the network component (e.g., lock all or a portion of features of the network component until the vulnerability is remediated). As such, in some embodiments an application may be uploaded or downloaded to the network device 20 that locks at least a portion of the features of the network component until the vulnerability is remediated (e.g., until software is downloaded, created, implemented, and/or a process is implemented and/or changed that would remediate the vulnerability).

Block 330 of FIG. 3 further illustrates that consequence actions are generated for the vulnerabilities and/or the network components if the vulnerabilities are not remediated (e.g., if the user does in implement the remediation plan and/or the vulnerabilities are not remediated). The consequence actions may include preventing the operation of a portion of the network component, removing at least a portion of the network component from the network 2, or the like. In some examples, network devices 20 may be prevented from accessing the network (e.g., preventing the network device from connecting to the network 2), may be powered off (e.g., remotely power off and/or prevented from turning on), a feature of the network device may be disconnected (e.g., communication interface operation may be disabled, or the like), authentication requirements may be changed, administrator access may be changed, or the like. In other examples, network applications 27 may be removed from the network device (e.g., remotely or on-site), software may be updated (e.g., remotely, on-site, or the like), network applications may be uploaded (e.g., remotely, on-site, or the like) to prevent the occurrence of the vulnerability.

FIG. 3 further illustrates in block 340 that triggers are generated for the implementation of the consequence actions. For example, the trigger for the implementation of the consequence action may include the failure to implement the remediation plan before the remediation deadline, failure to remediate the vulnerability before a deadline, failure of the primary user to respond to alerts for implementing the remediation plan, the user 4 taking an action that is counter to the remediation plan (e.g., does not implementation portions of the remediation plan, causes another vulnerability, is involved in a security breach, or the like), or the like.

With respect to blocks 320 through 340, the remediation plans, the consequence actions, and/or the triggers may be stored with reference to the stored vulnerabilities and/or the network components in a vulnerability database and/or other databases (e.g., remediation plan database, consequence action database, and/or trigger database with reference to each other) in the one or more organization systems 10, the one or more third party systems 30, and/or other systems 40. Moreover, it should be understood that the identification of the vulnerabilities, the remediation plans, and/or the consequence actions may be identified, created, and/or received by third-parties. For example, the organization may use a third-party system 30 and/or a third-party application 37 that the organization does not control, and thus, may not be aware of the vulnerabilities, remediation plans, consequence actions, and/or triggers, and as such, may work with the third-parties to set-up the foregoing.

Block 350 of FIG. 3 illustrates that the network components are monitored for vulnerabilities. It should be understood that the network components may be monitored in real-time or periodically by accessing the network component remotely and monitoring actions taken by the users 4 of the network component and/or the operation of the network component. Alternatively, the network components (e.g., devices and/or application) may store network component information (e.g., network device information, network application information, user information, such as user actions), and send such network component information to the organization system 10 or allow the organization systems 10 to access the network component information. As such, in some embodiments of the invention the organization systems 10 (e.g., directly or through the use of the user computer systems) create a link with the network devices 20 and/or third-party systems 30 in order to monitor the network devices 20. Regardless of how the network components are monitored, the monitoring may result in the identification of vulnerabilities for the network components. For example, the monitoring may identify viruses, unauthorized access, spyware, or other like vulnerabilities on the network component, and/or may identify operation of the network components that does not meet organization policies, such as unauthorized applications that were downloaded, unauthorized use, unauthorized data transfer, or the like by users 4.

It should be understood that in some embodiments, when a vulnerability is identified the vulnerability is assigned a unique identifier that is used to track the vulnerability over time. In this way, each vulnerability may be monitored individually, stored, and/or revisited even after the vulnerability has been remediated. Vulnerability information may be stored with the unique identifier in order to provide remediation, user, consequence, trigger, and/or other like information for the vulnerability that can be used in the future to provide better identification and remediation of future vulnerabilities. The vulnerability information may be stored and may include information regarding how the vulnerability occurred, how the vulnerability was remediated, the users that caused and/or remediated the vulnerabilities, or the like. The tracking of vulnerabilities over time may also lend information for determined what is a vulnerability, what vulnerabilities may be identified as acceptable vulnerabilities, and/or tracking users associated with multiple vulnerabilities.

As illustrated in block 360 of FIG. 3, a remediation plan is identified for the network components that have vulnerabilities that were identified (e.g., as described with respect to block 350). As previously discussed, the remediation plan, or parts thereof, may have been previously determined and stored with respect to particular vulnerabilities and/or network components. As such, the remediation plan may be identified by accessing a remediation plan associated with a vulnerability identified or a particular network component. It should be understood that there may be multiple remediation plans associated with a vulnerability and/or network component, and as such, one of a plurality of remediation plans may be selected (e.g., automatically, or by a user). It should be understood that the remediation plan selected may be based not only on the vulnerability identified, but also the network component associated with the vulnerability. For example, the same vulnerability may be occurring for the same network application on different network devices (e.g., computer from entity 1 and computer from entity 2). In response, there may be different remediation plans for the same network applications that is located on different network devices.

Block 370 of FIG. 3 illustrates that the remediation plan is implemented after identifying a vulnerability. In some embodiments, when there are two or more vulnerabilities, each vulnerability may be remediated based on the assigned priority classification and/or the duration of the vulnerability (e.g., how long the vulnerability has been outstanding). For example, with respect to vulnerabilities that have the same priority classification, the vulnerability that has been outstanding longer may be remediated first (e.g., if the vulnerabilities cannot be remediated at the same time). In some embodiments, the remediation plan may begin implementation by providing an alert to at least one user 4 associated with the network component (e.g., the primary user). The alert may be a notification (e.g., electronic communication, such as SMS message, e-mail, popup on user computer system, telephone call, or the like) that is provided to the primary user that is responsible for the network component. In some embodiments of the invention, in response to the alert, the user 4 may be required to respond to the alert in order to begin implementation of the remediation plan.

Alternatively, in some embodiment of the invention the organization systems 10 (e.g., in some cases through user computer systems) may implement the remediation plan automatically without alerting the user 4 and/or receiving a response from the user.

As previously discussed herein, it may take time for the user 4 (or alternatively the organization) to begin implementation of the remediation plan, because a work-around must first be implemented, network component downtime must be scheduled, the remediation plan must be synced between multiple network components, or the like.

Also, as previously discussed the remediation plan may include a process for remediating the network component, a patch, new software, or the like that must be downloaded (or pushed) to the network component in order to implement the remediation plan. In other embodiments, hardware upgrades, replacement, and/or removal may be required to implement the remediation plan.

As the remediation plan is being implemented, it should be understood that at least a portion of the network components may be suspended from operation (e.g., frozen, or the like), in order to prevent a potential vulnerability from becoming an actual unauthorized event before the vulnerability is remediated. Suspending operation of the network component may include preventing the user 4 from taking any actions with respect to the network components unless the actions relate to remediation of the vulnerability.

Block 380 of FIG. 3 illustrates that before, during, and/or after implementation of the remediation plan, monitoring of the network components may be continued in order to identify the status of the remediation plan (e.g., not implemented, being implemented, or implementation completed) and/or monitoring if the vulnerability has been remediated by the remediation plan. Moreover, the network components, remediation plan, users 4, and/or the like are monitored for the identification of triggers associated with the vulnerability and/or the remediation plan. That is, monitoring occurs in order to identify triggers that would result in the implementation of consequence actions. As previously discussed herein, the triggers may include the occurrence or non-occurrence of anything associated with the network component, user, and/or remediation plan in order to determine if the vulnerability is or will be remediated, or if the actions of the user or continued operation of the network component has resulted in a security threat from the vulnerability.

Block 390 of FIG. 3 illustrates that after a trigger is identified, the consequence actions are implemented. As previously discussed the consequence actions may include removal of the network component from the network 2. Removal may include the organization systems 10 (e.g., directly or through user computer systems) accessing (e.g., logging into, pushing, or the like) the network component to instruct the network component to power down, removing a network application from the network device, changing the login credentials of a user 4 to prevent user access, changing the network 2 information to prevent the network component from accessing the network 2, electronically altering the network component so that it cannot function. Instead of removal of the network component, other consequence actions may include suspending operation of at least a portion of network component, suspending the ability of the user 4 to operate the network components, or the like.

In some embodiments, before implementation of the consequence actions, and in particular removal of the network component, confirmation of the removal of the network component may be escalated for approval, such as escalated within the organization (e.g., a team leader, business group leader, line of business leader, executive, or the like). It should be understood that in some embodiments, approval must be received before the consequence action is implemented. In other embodiments, the consequence action may be implemented automatically after a trigger is identified without escalation. Regardless of whether or not the removal of the network component is escalated for approval, the organizational impact of removal of the network component may be evaluated before removal of the network component occurs. For example, in some embodiment the effect the removal of the network component will have on the operation of the organization business may be identified before removal is allowed. In order to evaluate the network component for removal, the organization systems 10 (or user computer system acting on behalf of the organization systems 10) may access and/or pull information from the organization systems 10, network devices 20, third-party systems 30, and/or other systems 40 in order to determine the impact removal of the network component will have on other systems and devices. As such, in some embodiments the network component may be tagged with information regarding the other network components or operations that rely on the network component being potentially removed. The tags may allow the organization systems 10 to automatically determine if the network component is essential to the operation of the organization, and in response allow the removal of the network component, or otherwise remediate the vulnerability without removal if the network component is essential to the operation of the organization.

It should be understood, that the systems described herein may be configured to establish a communication link (e.g., electronic link, or the like) with each other in order to accomplish the steps of the processes described herein. The link may be an internal link within the same entity (e.g., within the same financial institution) or a link with the other entity systems. In some embodiments, the one or more systems may be configured for selectively responding to dynamic authentication inquires. These feeds of resource usage and availability may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 15/889,789 | EXCEPTION REMEDIATION ACCEPTABLE USE LOGIC PLATFORM | Concurrently herewith |
| 15/889,944 | NETWORK DEVICE OWNER IDENTIFICATION AND COMMUNICATION TRIGGERING SYSTEM | Concurrently herewith |
| 15/889,949 | EXCEPTION REMEDIATION LOGIC ROUTING AND SUPPRESSION PLATFORM | Concurrently herewith |
| 15/889,799 | EXCEPTION REMEDIATION LOGIC ROLLING PLATFORM | Concurrently herewith |

What is claimed is:

1. A system for triggering consequence actions for network component vulnerabilities, the system comprising:
   one or more memories having computer readable code stored thereon; and
   one or more processors operatively coupled to the one or more memories, wherein the one or more processors are configured to execute the computer readable code to:
      monitor network components for vulnerabilities;
      identify a vulnerability, wherein the vulnerability is related to at least one network component of the network components;
      identify a primary user of the network components via accessing one or more systems of record which store user details for the network components and assigning a designation of the primary user based on network traffic, network use, and specific network component use of the primary user;
      identify a remediation plan for the vulnerability for the at least one network component, wherein the remediation plan comprises a notification to the primary user identifying the at least one network component, a procedure for mitigating or removing the vulnerability, and one or more links to software updates for the at least one network component;
      implement the remediation plan for the at least one network component by alerting the primary user of the vulnerability and the remediation plan for remediating the vulnerability and suppressing at least a portion of the operation of the at least one network component by locking only a portion of features of the at least one network component;
      continue to monitor the at least one network component for compliance with the implementation of the remediation plan;
      identify a trigger for implementing a consequence action for the at least one network component when the compliance with the remediation plan fails to be met, wherein the trigger comprises a failure to complete the remediation plan by a remediation deadline; and
      implement the consequence action for the at least one network component when the trigger is identified.

2. The system of claim 1, wherein the consequence action for the at least one network component comprises continuing locking only the portion of the features of the at least one network component until the remediation plan implementation is completed, wherein locking only the portion of the features of the at least one network component comprises remotely accessing and controlling the at least one network component.

3. The system of claim 1, wherein the consequence action for the at least one network component comprises removal of the at least one network component from a network.

4. The system of claim 3, wherein the removal of the at least one network component comprises remotely disconnecting the at least one network component from the network.

5. The system of claim 3, wherein the removal of the at least one network component comprises blocking a connection of the at least one network component to the network.

6. The system of claim 3, wherein the removal of the at least one network component comprises uninstalling the at least one network component.

7. The system of claim 3, wherein the removal of the at least one network component comprises deactivating operation of the at least one network component.

8. The system of claim 3, wherein the removal of the at least one network component comprises remotely powering down the at least one network component.

9. The system of claim 1, wherein the trigger comprises the primary user of the network component failing to respond to an alert regarding the remediation plan.

10. The system of claim 1, wherein implementing the remediation plan further comprises providing network component updates to remediate the vulnerability.

11. The system of claim 1, wherein the one or more processors are configured to execute the computer readable code to:
   classify the vulnerabilities for the network components based on priority of the vulnerabilities, the network components exposed to the vulnerabilities, and primary users associated with the vulnerabilities;

generate remediation plans for the vulnerabilities;

generate the consequence actions for the vulnerabilities; and generate triggers for implementing the consequence actions.

12. The system of claim 11, wherein the vulnerabilities are classified based on priority of remediation for the vulnerabilities.

13. The system of claim 12, wherein the priority of remediation for the vulnerabilities are determined based on a scope of the vulnerability, the network components affected by the vulnerability, connection of the network components to other network components, or the primary users of the network components.

14. The system of claim 1, wherein the network component comprises a network device or a network application.

15. A computer implemented method for triggering consequence actions for network component vulnerabilities, the method comprising:

monitoring, by one or more processors, network components for vulnerabilities;

identifying, by the one or more processors, a vulnerability, wherein the vulnerability is related to at least one network component of the network components;

identifying a primary user of the network components via accessing one or more systems of record which store user details for the network components and assigning a designation of the primary user based on network traffic, network use, and specific network component use of the primary user;

identifying, by the one or more processors, a remediation plan for the vulnerability for the at least one network component, wherein the remediation plan comprises a notification to the primary user identifying the at least one network component, a procedure for mitigating or removing the vulnerability, and one or more links to software updates for the at least one network component;

implementing, by the one or more processors, the remediation plan for the at least one network component by alerting the primary user of the vulnerability and the remediation plan for remediating the vulnerability and suppressing at least a portion of the operation of the at least one network component by locking only a portion of features of the at least one network component;

continue monitoring, by the one or more processors, the at least one network component for compliance with the implementation of remediation plan;

identifying, by the one or more processors, a trigger for implementing a consequence action for the at least one network component when the compliance with the remediation plan fails to be met, wherein the trigger comprises a failure to complete the remediation plan by a remediation deadline; and implementing, by the one or more processors, the consequence action for the at least one network component when the trigger is identified.

16. The method of claim 15, wherein the consequence action for the at least one network component comprises removal of the at least one network component from a network, wherein the removal comprises remotely disconnecting the at least one network component from the network, blocking a connection of the at least one network component to the network, uninstalling the at least one network component, deactivating the operation of the at least one network component, or remotely powering down the at least one network component.

17. A computer program product for triggering consequence actions for network component vulnerabilities, the computer program product comprising at least one non-transitory computer-readable medium having computer-readable program code portions embodied therein, the computer-readable program code portions comprising:

an executable portion configured to monitor network components for vulnerabilities;

an executable portion configured to identify a vulnerability, wherein the vulnerability is related to at least one network component of the network components;

an executable portion configured to identify a primary user of the network components via accessing one or more systems of record which store user details for the network components and assigning a designation of the primary user based on network traffic, network use, and specific network component use of the primary user;

an executable portion configured to identify a remediation plan for the vulnerability for the at least one network component, wherein the remediation plan comprises a notification to the primary user identifying the at least one network component, a procedure for mitigating or removing the vulnerability, and one or more links to software updates for the at least one network component;

an executable portion configured to implement the remediation plan for the at least one network component by alerting the primary user of the vulnerability and the remediation plan for remediating the vulnerability and suppressing at least a portion of the operation of the at least one network component by locking only a portion of features of the at least one network component;

an executable portion configured to continue to monitor the at least one network component for compliance with the remediation plan;

an executable portion configured to identify a trigger for implementing a consequence action for the at least one network component when the compliance with the remediation plan fails to be met, wherein the trigger comprises a failure to complete the remediation plan by a remediation deadline; and an executable portion configured to implement the consequence action for the at least one network component when the trigger is identified.

* * * * *